(12) United States Patent
Morris

(10) Patent No.: US 10,785,524 B1
(45) Date of Patent: Sep. 22, 2020

(54) TELEMATICS INTEGRATION ENABLING INDEXING AND VIEWING OF ASSOCIATED EVENT VIDEOS

(71) Applicant: Lytx, Inc., San Diego, CA (US)

(72) Inventor: Rael Morris, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 38 days.

(21) Appl. No.: 15/806,172

(22) Filed: Nov. 7, 2017

(51) Int. Cl.
*G06Q 10/06* (2012.01)
*H04N 21/414* (2011.01)
*H04N 21/45* (2011.01)
*H04N 21/488* (2011.01)
*G08G 1/096* (2006.01)

(52) U.S. Cl.
CPC ... *H04N 21/41422* (2013.01); *H04N 21/4524* (2013.01); *H04N 21/4882* (2013.01)

(58) Field of Classification Search
None
See application file for complete search history.

(56) References Cited

U.S. PATENT DOCUMENTS

| | | | | |
|---|---|---|---|---|
| 8,803,695 B2* | 8/2014 | Denson | ............... | G06F 16/2365 340/576 |
| 9,298,575 B2* | 3/2016 | Tamari | ................... | G08G 1/123 |
| 2007/0043487 A1* | 2/2007 | Krzystofczyk | ........ | G06Q 10/06 701/29.5 |
| 2007/0136078 A1* | 6/2007 | Plante | .................... | G06Q 10/00 348/148 |
| 2007/0268158 A1* | 11/2007 | Gunderson | ............ | G06Q 40/08 340/933 |
| 2014/0094992 A1* | 4/2014 | Lambert | ................ | G07C 5/008 701/1 |
| 2014/0226010 A1* | 8/2014 | Molin | .................... | G06Q 10/06 348/148 |
| 2015/0088335 A1* | 3/2015 | Lambert | ................ | G08G 1/162 701/1 |
| 2015/0127570 A1* | 5/2015 | Doughty | .............. | G06Q 50/265 705/325 |
| 2015/0170522 A1* | 6/2015 | Noh | .................. | G08G 1/096741 701/117 |

* cited by examiner

*Primary Examiner* — Nasser M Goodarzi
*Assistant Examiner* — Terrika Peterson
(74) *Attorney, Agent, or Firm* — Van Pelt, Yi & James LLP

(57) ABSTRACT

A system for telematics integration includes a video system configured to receive an event email notification from a telematics system. The telematics system was provided an email address for the event email notification. The video system is further configured to scrape the event email notification for event information and to determine whether event information satisfies criteria to generate trigger criteria for an event of interest. Then video system is further configured to, in the event that the event information satisfies the criteria to generate the trigger criteria, retrieve associated video from a video repository of the video system based at least in part on the trigger criteria.

18 Claims, 8 Drawing Sheets

TELEMATICS INTEGRATION ENABLING INDEXING AND VIEWING OF ASSOCIATED EVENT VIDEOS

BACKGROUND OF THE INVENTION

Currently integrations between video services and telematics solutions are built in a one-to-one approach using application peripheral interface (API) integrations between the telematics applications and the video services application. This legacy approach is time consuming, requires custom development for every pair-wise integration, and also requires access and licensing of APIs from the vendors of both video and telematics platforms. The integrations have to be specified in detail and, once developed, require significant effort to maintain or to make any changes.

BRIEF DESCRIPTION OF THE DRAWINGS

Various embodiments of the invention are disclosed in the following detailed description and the accompanying drawings.

DETAILED DESCRIPTION

Figure 1:
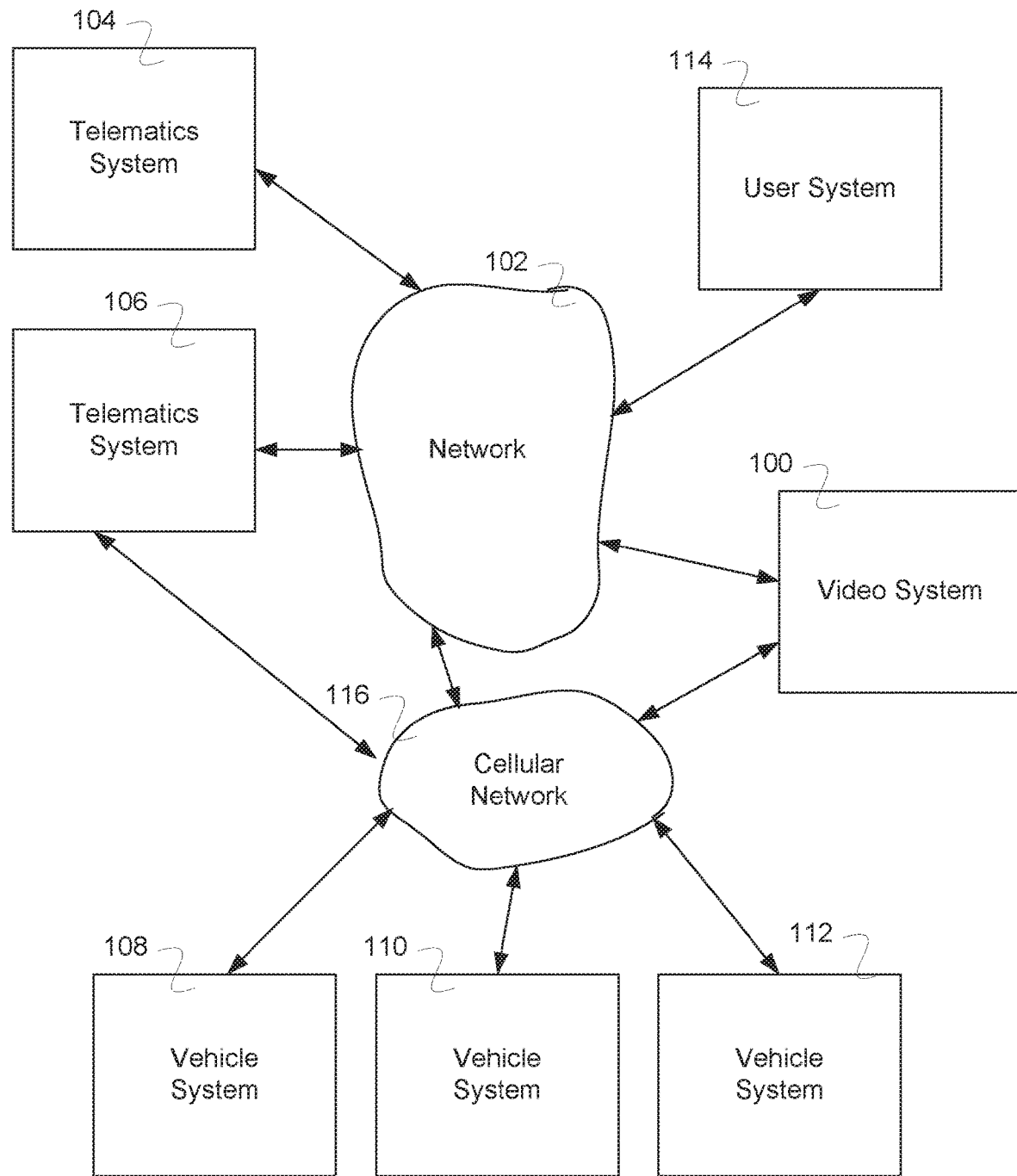
FIG. 1 is a diagram illustrating an embodiment of a system for telematics integration.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for telematics integration is disclosed. The system comprises a video system configured to receive an event email notification from a telematics system. The telematics system was provided an email address for the event email notification. The video system is configured to scrape the event email notification and determine whether event satisfies criteria to generate trigger criteria for an event of interest, and retrieve associated video from a video repository of the video system based at least in part on the trigger criteria in the event that the event satisfies the criteria to generate the trigger criteria.

The telematics integration system leverages the universal existence of an e-mail notification engine in telematics applications as the source for video-telematics integration meta-data. The notification engine is historically used to notify users of the telematics platform of a client specified event by sending an e-mail notification to a designated recipient list when client specified conditions are met. The telematics integration system utilizes the addition (e.g., by the system configuration or by the client) of a generic e-mail addressed to the e-mail integration service, any time a video recording of the desired event is needed or wanted. The telematics integration system receives event meta-data via e-mail notification and scrapes pertinent information (e.g., vehicle ID and timestamp of an event) from the e-mail in order to generate a trigger for obtaining videos related to the event. This allows a user of a telematics system to easily specify the conditions in which video is to be captured/indexed/uploaded for a visual recording of the desired event. In various embodiments, the telematics system comprises a vehicle tracking system, a vehicle monitoring system, a delivery management system, logistic management system, fleet management system, fuel card system, or any other system associated with vehicles. The system qualifies events by providing conditions for events to the telematics system for a first level of checking and then a second level of checking to determine whether a trigger criteria is satisfied for retrieving data from a vehicle system and/or a video system storage. In some cases, one of these checks is omitted and the video is retrieved based on only one condition, In some cases, the criteria is/are modified at the telematics system or at the video system using feedback after consistency check information does not pass one or more times.

The value of this system is that it provides for the development of a telematics integration system that easily and rapidly integrates between any telematics (or other operational platform) with a video service. It alleviates the need for time-consuming API-based one-to-one integrations that cannot cost-effectively be developed in sufficient numbers to reasonably span the spectrum of available telematics platforms in existence.

FIG. 1 is a diagram illustrating an embodiment of a system for telematics integration. In the example shown, a vehicle system (e.g., vehicle system 108, vehicle system 110, and vehicle system 112) provides data regarding driving routes, vehicle state, driving data, video streams, images, vehicle sensor data to video system 100 and/or to a telematics system (e.g., telematics system 104 or telematics system 106) using cellular network 116 and/or network 102. In various embodiments, network 102 comprises a wired network, a wireless network, the Internet, a local area network, a combination of networks, or any other appropriate combination of communication systems. User system 114 is informed of events that occur as gleaned from the data received by video system 110 or the telematics systems. In order to properly determine events, a full set of data is analyzed by one system. The telematics systems are configured to provide notification to video system 100. The system enables easier integration and swifter adaptation to changes by the telematics systems by integrating a telematics system using email as the notification mechanism. A telematics system is configured to send the notification in the event that specified circumstances are satisfied and data regarding the event are emailed to video system 100. The notification received by video system 100 is parsed to extract information about the event (e.g., template identifier, pertinent information identifier, sender information, customer information, time stamp, vehicle identifier, location of event, etc.). A check is made as to whether the event information is relevant to video server 100 (e.g., is customer relevant? is vehicle relevant? is location relevant? etc.). Video server 100 then determines whether the event satisfies criteria to generate trigger criteria for an event of interest. In the event that the event satisfies the criteria to generate the trigger criteria, associated video is retrieved from a video repository of video system 100 based at least in part on the trigger criteria. The trigger criteria may also be generated using sensor information from a vehicle (e.g., vehicle system 108, vehicle system 110, or vehicle system 112) or from other telematics systems.

Figure 2A:
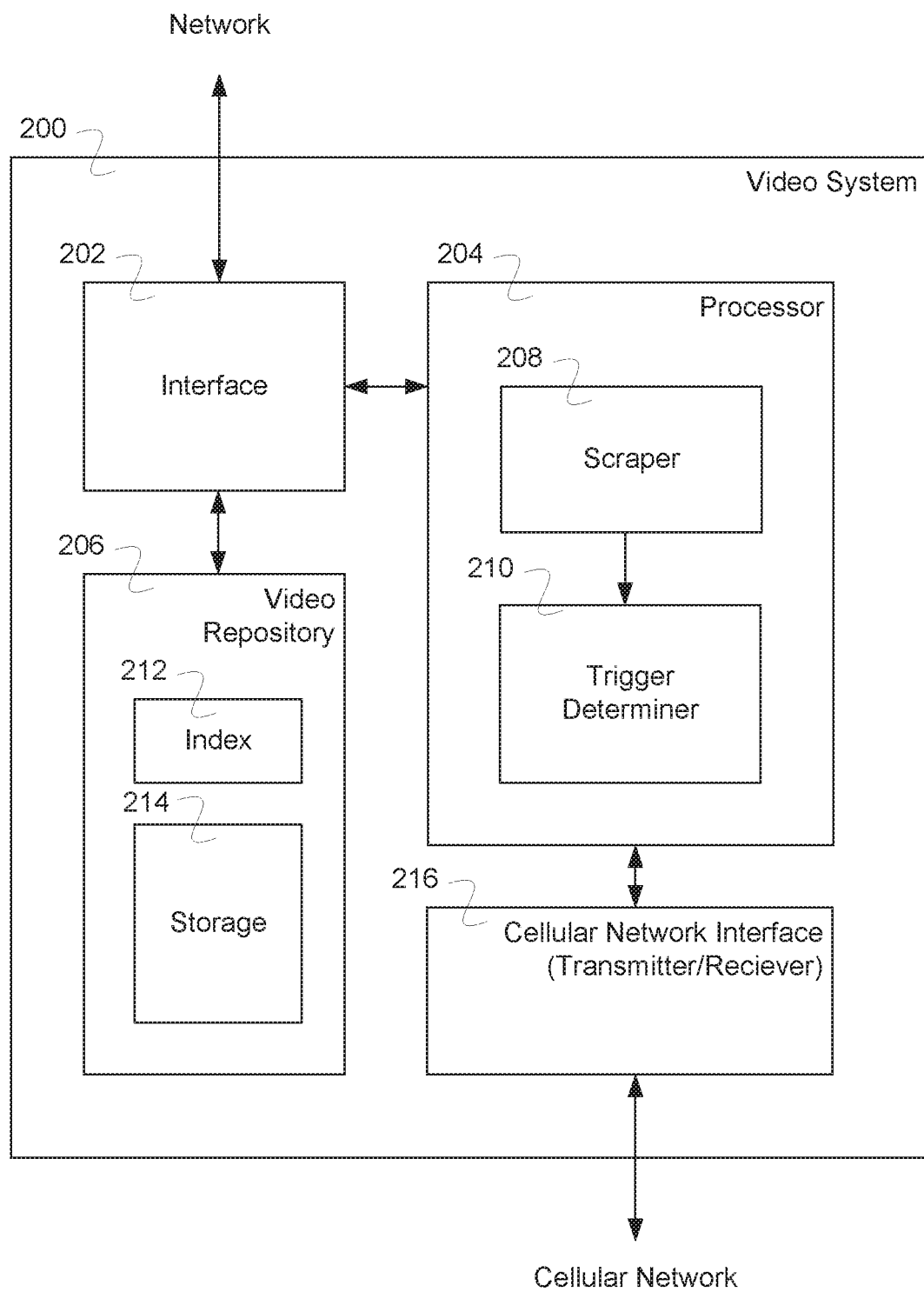
FIG. 2A is a diagram illustrating an embodiment of a video system.

FIG. 2A is a diagram illustrating an embodiment of a video system. In some embodiments, video system 200 is used to implement video system 100 of FIG. 1. In the example shown, video system 200 includes processor 204, interface 202, and video repository 206. Processor 204 includes scraper 208 and trigger determiner 210. Interface 202 receives notification from a telematics system and provides to scraper 208 of processor 204. Scraper 208 determines information regarding an event associated with the notification. The information is provided to trigger determiner 210 to use in determining a trigger for videos relevant to an event of interest. The trigger is used to search video repository 206 for videos associated with the trigger (e.g., a location, a time, a vehicle, etc. associated with the event of interest). Index 212 of video repository 206 is used to find appropriate videos stored in storage 214 of video repository 206. Also, if appropriate, processor 204 communicates with vehicle(s) to identify video(s) relevant to trigger using cellular network interface 216, which includes a cellular transmitter/receiver, and retrieves appropriate video(s). Retrieved video(s) may be indexed and stored in video repository 206. The appropriate videos from the repository and retrieved from vehicle(s) are returned via interface 202 to a user using a user system.

Figure 2B:
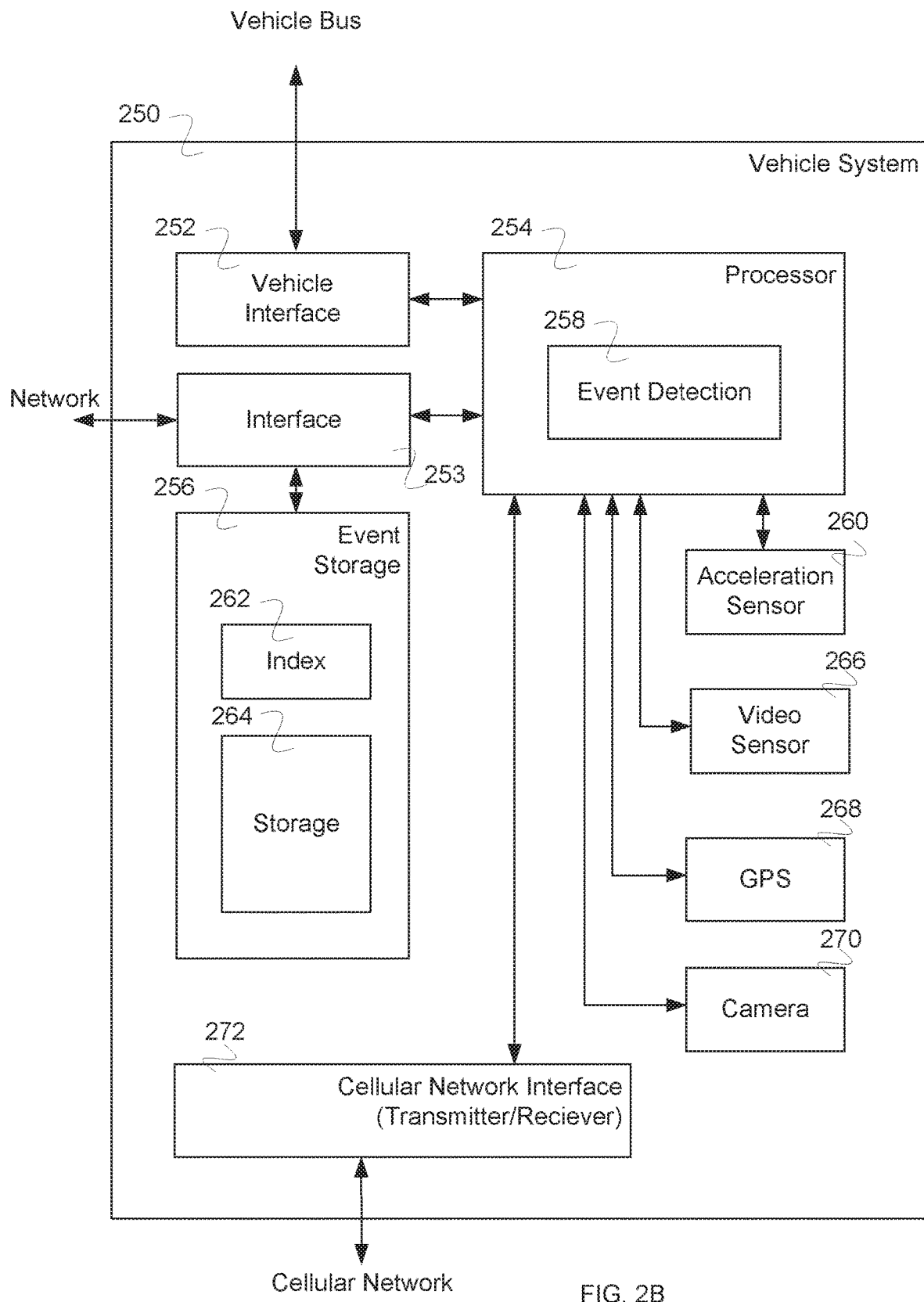
FIG. 2B is a diagram illustrating an embodiment of a vehicle system.

FIG. 2B is a diagram illustrating an embodiment of a vehicle system. In various embodiments, vehicle system 250 is used to implement vehicle system 108, vehicle system 110, and/or vehicle system 112 of FIG. 1. In the example shown, vehicle system 250 measures a vehicle using sensors while being driven—for example, using acceleration sensor 260, video sensor 266, global positioning system (GPS) 268, camera 270, or any other appropriate sensor. In some cases, video sensor 266 or camera 270 are one of a plurality of video sensors or one of a plurality of cameras. In some embodiments, video sensor 266 and camera 270 are integrated into one physical unit. The data from the sensors is used to detect events by event detection 258 of processor 254. Vehicle system 250 also receives information from vehicle sensors via a vehicle bus and vehicle interface 252. Data from the sensors associated with events is stored in storage 264 of event storage 256 and indexed in index 262. In some cases, vehicle system 250 is connected to a network—for example, a wired connection or a wireless network (e.g., local hot spot in a vehicle depot yard)—for example, via interface 253. The event data is sent to (e.g., either pushed or requested from) a video system using cellular network interface 272, which includes a cellular transmitter/receiver. In some cases, the video system desires videos associated with an event of interest as defined using a trigger criteria and a request is made for videos or other event data associated with the trigger criteria. The processor searches stored event data in event storage 256 using index 262 and retrieves data/videos and provides them to a video system via the cellular network.

Figure 3:
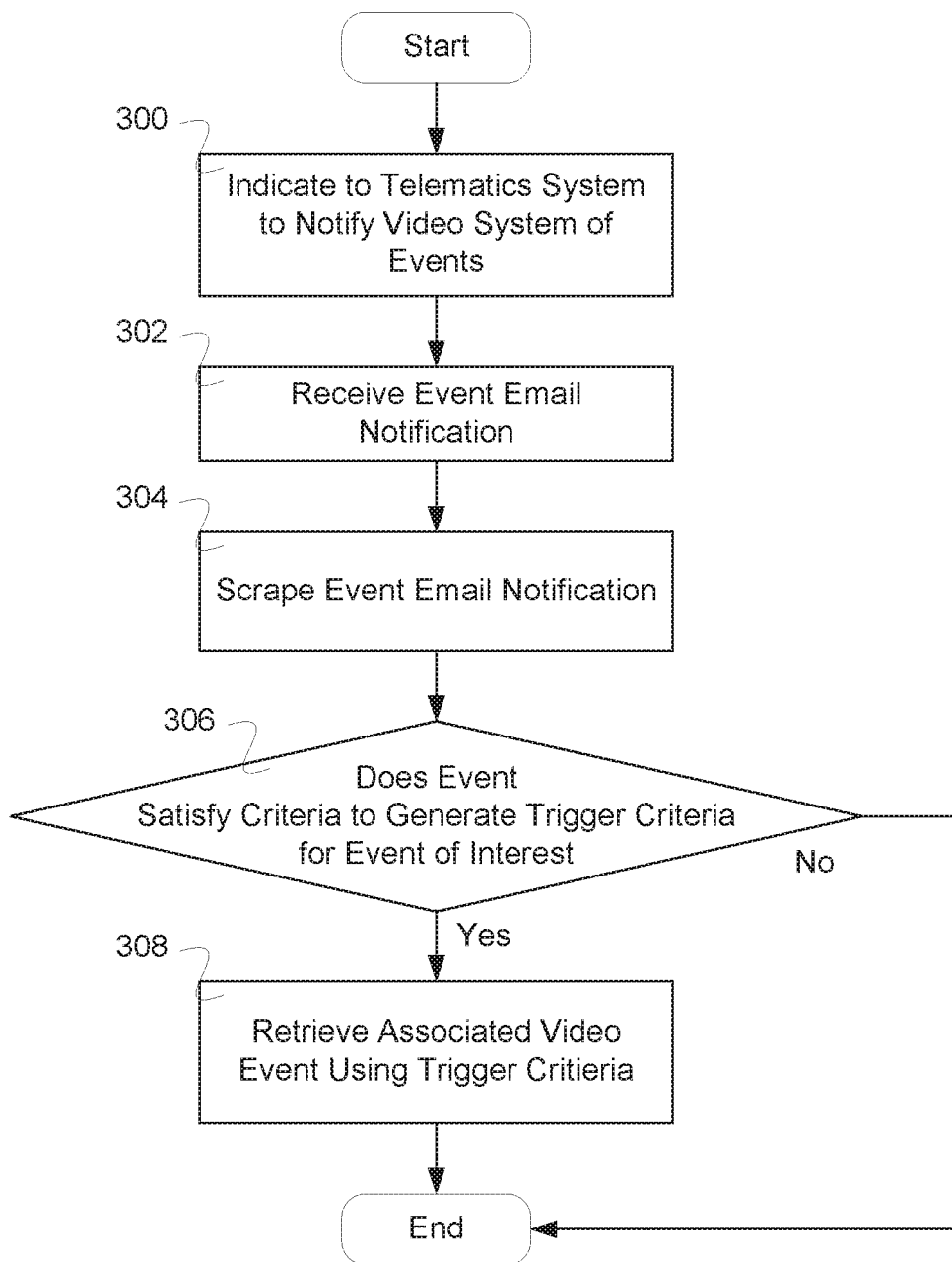
FIG. 3 is a flow diagram illustrating an embodiment of a process for telematics integration system.

FIG. 3 is a flow diagram illustrating an embodiment of a process for telematics integration system. In some embodiments, the process of FIG. 3 is executed using a video system (e.g., video system 100 of FIG. 1). In the example shown, in 300 it is indicated to a telematics system to notify a video system of events. For example, the telematics system is configured to notify the video system using an email notification system in the event that an event at a telematics system is detected, where the event is also configured to be of a character as defined by event parameters. In some embodiments, the telematics system has default event types that are sent as notifications. In some embodiments, other notifications are also sent that are not events and these notifications will be filtered out for video retrievals. In 302, an event email notification is received. For example, the telematics system emails information about an event to a video system (e.g., a telematics integration system). In 304, the event email notification is scraped. For example, information regarding an event is scraped from an email from a telematics system. In some embodiments, the email is parsed for information relevant for determining a trigger for an event of interest which is used to located videos of interest. In 306, it is determined whether an event satisfies criteria to generate trigger criteria for an event of interest. For example, even though conditions for an event are satisfied at the telematics system, the event may not pass consistency checks or may not also satisfy other criteria to retrieve video data (e.g., the event is no longer of interest, not of the right type, already sufficiently investigated, needs to be qualified by some other criteria, is not in the correct location, is not at the correct time, is not associated with an appropriate vehicle, is not associated with an appropriate driver, etc.). In the event that the event does not satisfy criteria to generate trigger criteria for event of interest, the process ends. In the event that the event does satisfy criteria to generate trigger criteria for event of interest, the control passes to 308. In 308, associated video events are retrieved using the trigger criteria. For example, a video repository is searched using an index for videos to be retrieved based on trigger criteria for events of interest. In various embodiments, trigger criteria include a location associated with an event of interest, a time associated with an event of interest, a vehicle associated with an event of interest, a customer associated with an event of interest, or any other appropriate criterion associated with an event of interest.

Figure 4:
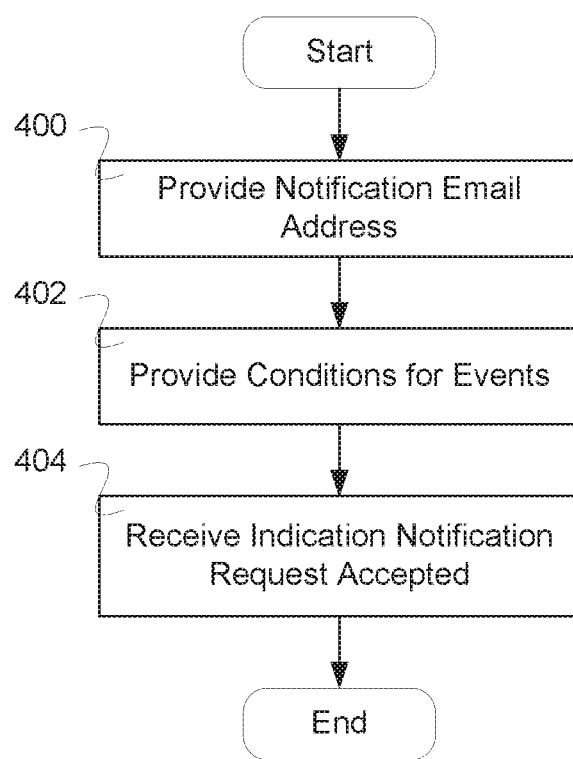
FIG. 4 is a flow diagram illustrating an embodiment of a process for indicating to a telematics system to notify video system of events.

FIG. 4 is a flow diagram illustrating an embodiment of a process for indicating to a telematics system to notify video system of events. In some embodiments, the process of FIG.

4 is used to implement 300 of FIG. 3. In the example shown, in 400 a notification email address is provided. For example, an email address is provided to a telematics system for notification to a video system. In 402, conditions for events are provided. For example, a telematics system is provided with criteria for events that are interesting to the video system and what the telematics system should be notifying the video system about. In some embodiments, no conditions are provided and this step is omitted. In some embodiments, the telematics system automatically provides notification to an email address regarding predetermined events as determined using predetermined criteria for events. In 404, an indication is received that the notification request was accepted. For example, the telematics system provides confirmation that email notification and/or conditions for events was received and accepted.

Figure 5:
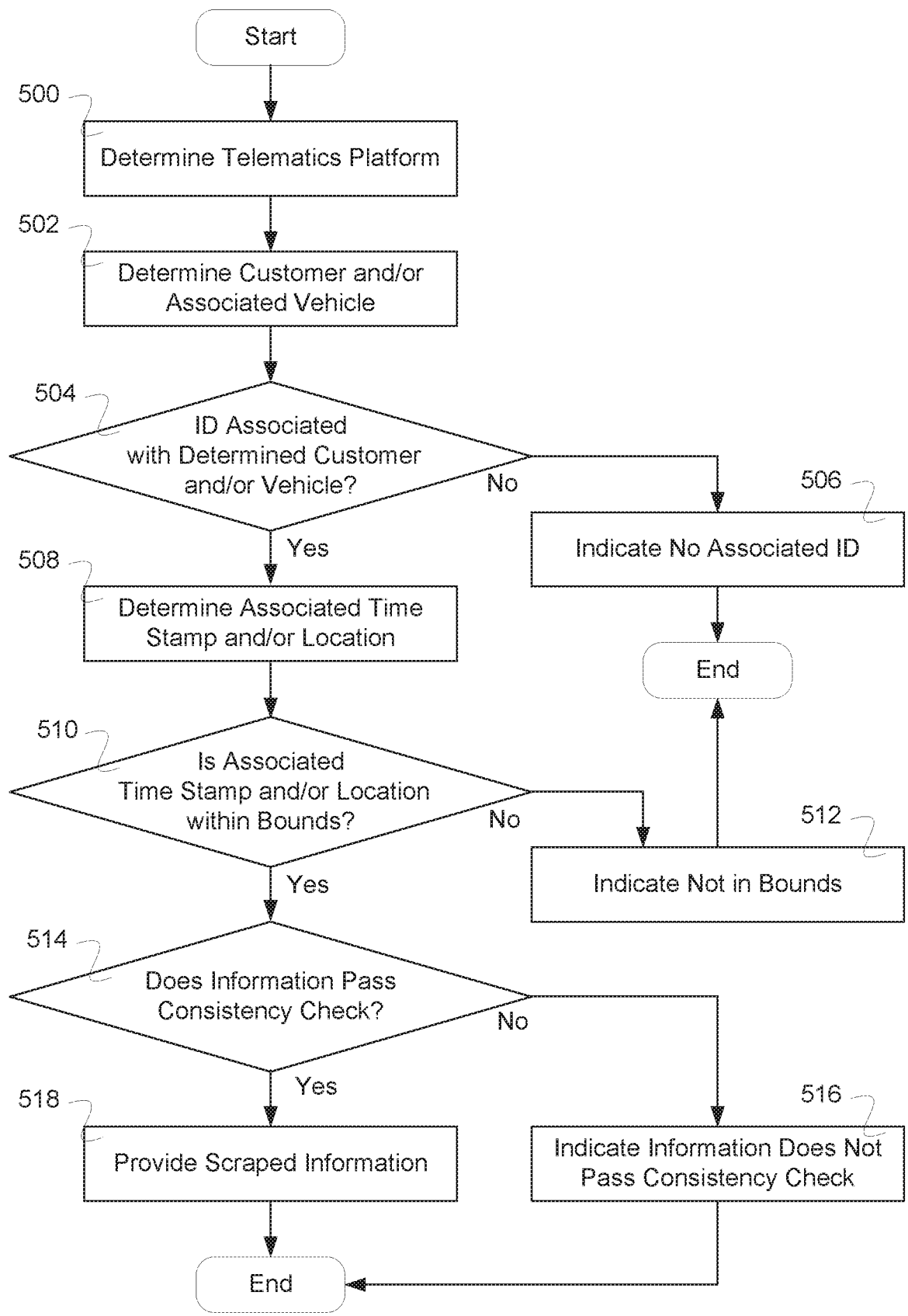
FIG. 5 is a flow diagram illustrating an embodiment of a process for scraping a notification.

FIG. 5 is a flow diagram illustrating an embodiment of a process for scraping a notification. In some embodiments, the process of FIG. 5 is used to implement 304 of FIG. 3. In the example shown, in 500 a telematics platform is determined. For example, the identity of the telematics system is determined from the notification (e.g., using a known set of characteristics of the notification—for example, a pattern or known text within the notification). In 502, a customer and/or associated vehicle are determined. For example, the notification is parsed to determine a customer and/or associated vehicle. In some embodiments, the customer is determined from a vehicle identifier by retrieving a customer associated with a vehicle identifier from a database. In 504, it is determined whether an ID is associated with a determined customer and/or vehicle. For example, the system determines an identifier indicating whether the notification is relevant to the system or not. In the event that there is not an ID associated with a determined customer and/or vehicle, then in 506 it is indicated that there is not an associated ID and the process ends. In the event that there is an ID associated with a determined customer and/or vehicle, then in 508 an associated time stamp and/or location are determined. For example, the time stamp of an event and/or location are determined from the information in the notification. In 510, it is determined whether the time stamp and/or location are with bounds. For example, it is determined whether the time stamp is within a time and/or date window (e.g., after a starting time limit and before an ending time limit), and/or the location is within a bounded set of location boundaries (e.g., within a radius from a point or within a set of boundary lines or delineating points in any appropriate shape). In various embodiments, the time stamp is checked to see if it is within bounds, the location is checked to see if it is within bounds, or the location and the time stamp are checked to see if they are within bounds. In the event that the time stamp and/or the location is not within bounds, in 512 it is indicated that the time stamp and/or location are not within bounds and the process ends. In the event that the time stamp and/or the location is within bounds, in 514 it is determined whether the information passes a consistency check. For example, the information is checked to see if the information is consistent with prior information received regarding the same vehicle and/or customer (e.g., similar travel locations/times for the same vehicle and/or customer, etc.). In the event that the information does not pass a consistency check, in 516 it is indicated that the information does not pass the consistency check, and the process ends. In some cases, in the event that the information does not pass a consistency check or does not pass multiple consistency checks (e.g., a counter is incremented each time a check is not passed and upon the counter exceeding a threshold value, the event conditions are changed as provided to the telematics system). In the event that the information does pass a consistency check, in 518 the scraped information is provided, and the process ends.

In various embodiments, scraped information comprises one or more of the following: company source, fleet, vehicle type, vehicle identifier, vehicle description, driver, event type (e.g., cornering, hard cornering, braking, hard braking, etc.), time, location, latitude, longitude, speed, heading, satellites, vehicle state, registration, trip distance, driver behavior, conditions for events, geofence information, operational data, or any other appropriate information.

Figure 6:
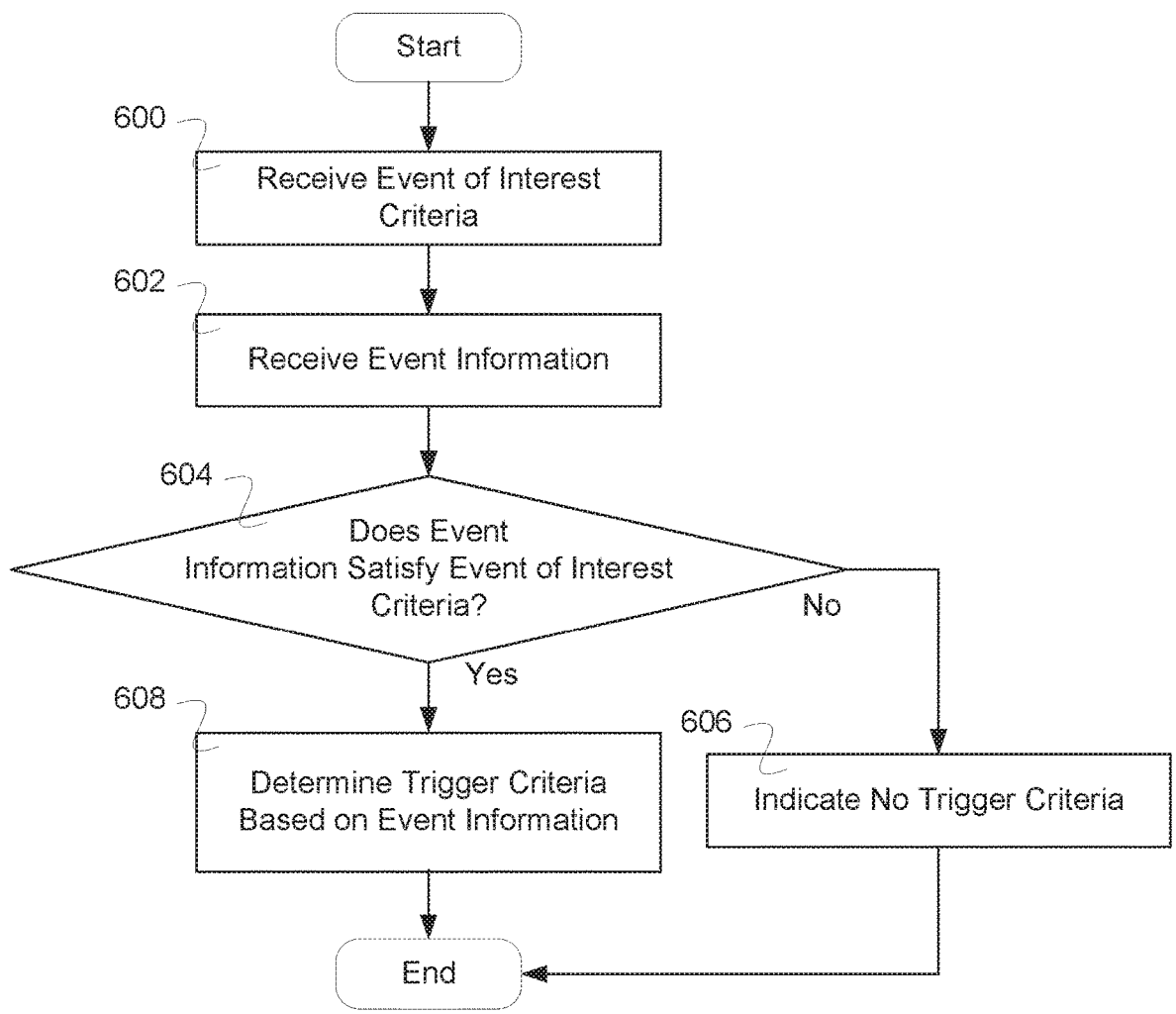
FIG. 6 is a flow diagram illustrating an embodiment for a process for satisfying a criteria to generate a trigger criteria.

FIG. 6 is a flow diagram illustrating an embodiment for a process for satisfying a criteria to generate a trigger criteria. In some embodiments, the process of FIG. 6 is used to implement 306 of FIG. 3. In the example shown, in 600 an event of interest criteria is received. In 602, event information is received. In 604, it is determined whether the event information satisfies an event of interest criteria. In the event that the event information does not satisfy an event of interest criteria, in 606 no trigger criteria is indicated. In the event that the event information does satisfy an event of interest criteria, in 608 a trigger criteria is determined based on the event information. For example, the trigger criteria comprise criteria for locating videos related to an event of interest (e.g., a location and time, an area and a time, a set of times and a set of locations, or any other appropriate criteria). In some embodiments, the trigger criteria correspond to a set of vehicles in a location (e.g., all trucks in a loading yard).

Figure 7:
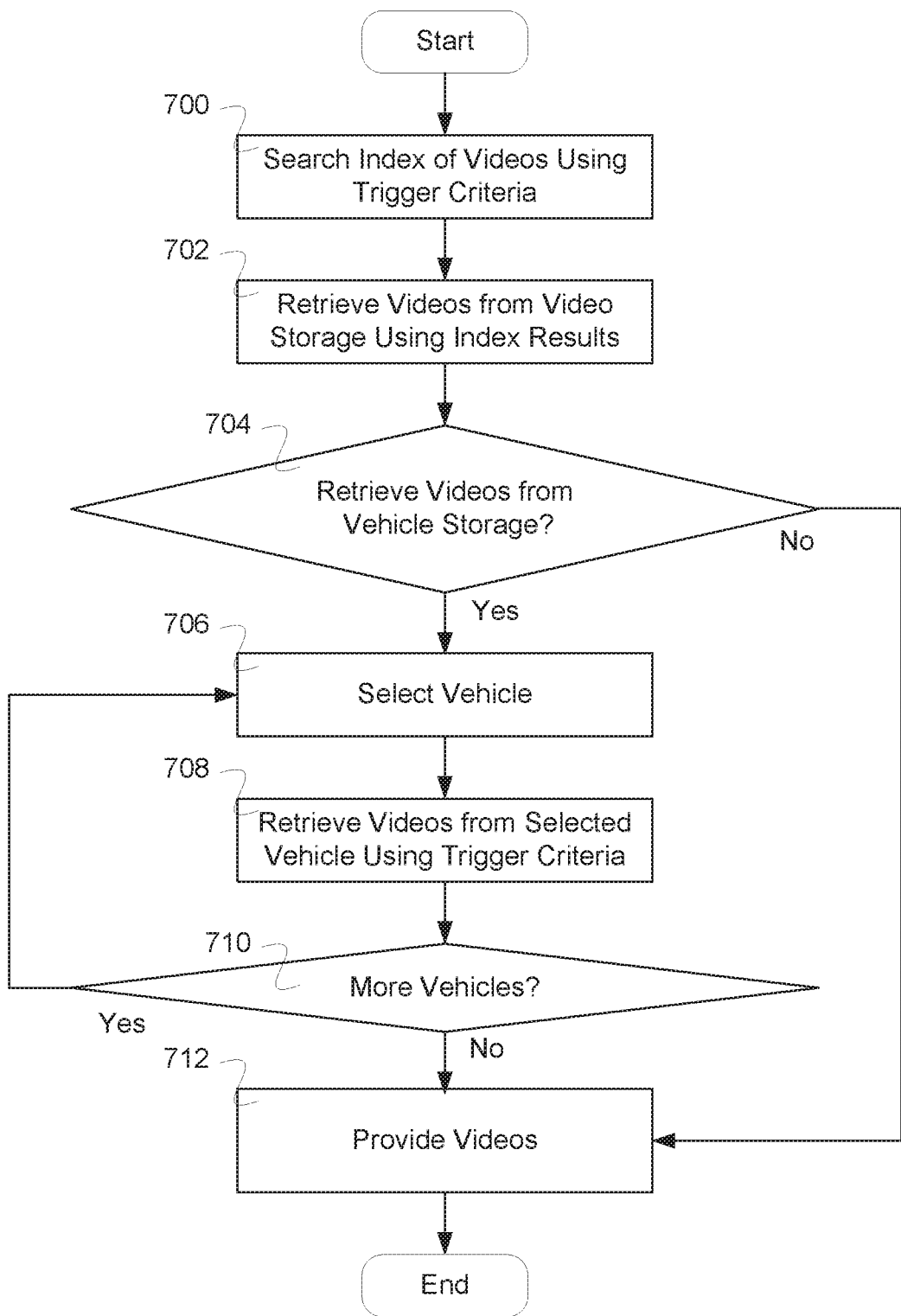
FIG. 7 is a flow diagram illustrating an embodiment for a process for retrieving an associated video.

FIG. 7 is a flow diagram illustrating an embodiment for a process for retrieving an associated video. In some embodiments, the process of FIG. 7 is used to implement 308 of FIG. 3. In the example shown, in 700 index of videos is searched using a trigger criteria. In 702, videos are retrieved from video storage using index results. In 704, it is determined whether videos should be retrieved from vehicle storage. For example, it is determined whether the system should contact one or more vehicle systems to retrieve videos. In the event that it is determined that videos should not be retrieved from vehicle storage, then control passes to 712. In the event that it is determined that videos should be retrieved from vehicle storage, then in 706 a vehicle is selected. In 708, videos are retrieved from selected vehicle using trigger criteria. For example, the video data associated with the trigger criteria are retrieved from a vehicle system. In some embodiments, the video data is retrieved with associated metadata information—for example, a vehicle identifier, a camera identifier, a timestamp, a location, a heading, etc. In 710, it is determined whether there are more vehicles. For example, it is determined whether there are more vehicles to retrieve videos from. In the event that there are more vehicles, then control passes to 706. In the event that there are not more vehicles, then control passes to 712. In 712, videos are provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for telematics integration, comprising:
a processor; and a memory coupled with the processor, wherein the memory is configured to provide the processor with instructions which when executed cause the processor to:
  receive an event email notification from a telematics system, wherein the telematics system was provided an email address for the event email notification;
  scrape the event email notification for event information, comprising to:
    parse the event email notification for the event information, the event information including a) an associated location, an associated time stamp, or a combination thereof, and b) a vehicle identifier;
    determine whether the event information passes a consistency check, comprising to:
      check to see whether the event information is consistent with prior information regarding the same vehicle, the same customer, or both; and
      in response to a determination that the event information does not pass the consistency check, indicate that the event information does not pass the consistency check;
  determine whether the event information satisfies criteria to generate trigger criteria for an event of interest, wherein the trigger criteria comprises a trigger location and a trigger time, a trigger area and trigger time, or a set of trigger times and a set of trigger locations, wherein the determining of whether the event information satisfies criteria to generate trigger criteria for an event of interest comprises to:
    perform three or more of the following:
    A) determine whether the event is no longer of interest; and
      in response to a determination that the event is no longer of interest, determine that the event information does not satisfy criteria to generate trigger criteria for the event of interest;
    B) determine whether the event is not of the right type; and
      in response to a determination that the event is not of the right type, determine that the event information does not satisfy criteria to generate trigger criteria for the event of interest;
    C) determine whether the event is already sufficiently investigated; and
      in response to a determination that the event is already sufficiently investigated, determine that the event information does not satisfy criteria to generate trigger criteria for the event of interest;
    D) determine whether the event is not in the trigger location or the set of trigger locations; and
      in response to a determination that the event is not in the trigger location or the set of trigger locations, determine that the event information does not satisfy criteria to generate trigger criteria for the event of interest; and/or
    E) determine whether the event is not at the trigger time; and
      in response to a determination that the event is not at the trigger correct time, determine that the event information does not satisfy criteria to generate trigger criteria for the event of interest; and
  in response to a determination that the event information satisfies the criteria to generate the trigger criteria, retrieve associated video from a video repository based at least in part on the trigger criteria, wherein the retrieving of the associated video comprises to retrieve the associated video based on metadata of the associated video, the metadata including a vehicle identifier, a camera identifier, a timestamp, a location, a heading, or any combination thereof.

2. The system as in claim 1, wherein the event information comprises a customer identifier.

3. The system as in claim 1, wherein the event information comprises an associated vehicle.

4. The system as in claim 1, wherein the event information comprises the associated time stamp.

5. The system as in claim 1, wherein the event information comprises the associated location.

6. The system as in claim 1, wherein the memory is further configured to provide the processor with instructions which when executed cause the processor to:
  determine whether the time stamp is within bounds.

7. The system as in claim 1, wherein the memory is further configured to provide the processor with instructions which when executed cause the processor to:
  determine whether the location is within bounds.

8. The system as in claim 1, wherein the trigger criteria comprise the trigger location.

9. The system as in claim 1, wherein the trigger criteria comprise the trigger time.

10. The system as in claim 1, wherein the trigger criteria comprise the trigger area.

11. The system as in claim 1, wherein the trigger criteria comprise the set of trigger locations.

12. The system as in claim 1, wherein the trigger criteria the set of trigger times.

13. The system as in claim 1, wherein retrieving the associated video uses an index of videos.

14. The system as in claim 1, wherein the email event notification is received from a telematics system.

15. The system as in claim 1, wherein retrieving the associated video is retrieving from one or more vehicle systems.

16. The system as in claim 1, wherein the determining of whether the event information satisfies criteria to generate trigger criteria for an event of interest comprises to:
  perform the following:
  A) determine whether the event is no longer of interest; and
    in response to a determination that the event is no longer of interest, determine that the event information does not satisfy criteria to generate trigger criteria for the event of interest;
  B) determine whether the event is not of the right type; and
    in response to a determination that the event is not of the right type, determine that the event information does not satisfy criteria to generate trigger criteria for the event of interest;
  C) determine whether the event is already sufficiently investigated; and
    in response to a determination that the event is already sufficiently investigated, determine that the event information does not satisfy criteria to generate trigger criteria for the event of interest;
  D) determine whether the event is not in the trigger location or the set of trigger locations; and
    in response to a determination that the event is not in the trigger location or the set of trigger locations, determine that the event information does not satisfy criteria to generate trigger criteria for the event of interest; and E) determine whether the event is not at the trigger time; and in response to a determination that the event is not at the trigger correct time, determine that the event information does not satisfy criteria to generate trigger criteria for the event of interest.

17. A method for telematics integration, comprising:

receiving an event email notification from a telematics system, wherein the telematics system was provided an email address for the event email notification;

scraping, using a processor, the event email notification for event information, comprising:

parsing the event email notification for the event information, the event information including a) an associated location, an associated time stamp, or a combination thereof, and b) a vehicle identifier;

determining whether the event information passes a consistency check, comprising:

checking to see whether the event information is consistent with prior information regarding the same vehicle, the same customer, or both; and in response to a determination that the event information does not pass the consistency check, indicating that the event information does not pass the consistency check;

determining whether the event information satisfies criteria to generate trigger criteria for an event of interest, wherein the trigger criteria comprises a trigger location and a trigger time, a trigger area and trigger time, or a set of trigger times and a set of trigger locations, wherein the determining of whether the event information satisfies criteria to generate trigger criteria for an event of interest comprises:

performing three or more of the following:

A) determine whether the event is no longer of interest; and in response to a determination that the event is no longer of interest, determine that the event information does not satisfy criteria to generate trigger criteria for the event of interest;

B) determine whether the event is not of the right type; and in response to a determination that the event is not of the right type, determine that the event information does not satisfy criteria to generate trigger criteria for the event of interest;

C) determine whether the event is already sufficiently investigated; and in response to a determination that the event is already sufficiently investigated, determine that the event information does not satisfy criteria to generate trigger criteria for the event of interest;

D) determine whether the event is not in the trigger location or the set of trigger locations; and in response to a determination that the event is not in the trigger location or the set of trigger locations, determine that the event information does not satisfy criteria to generate trigger criteria for the event of interest; and/or E) determine whether the event is not at the trigger time; and in response to a determination that the event is not at the trigger correct time, determine that the event information does not satisfy criteria to generate trigger criteria for the event of interest; and in response to a determination that the event information satisfies the criteria to generate the trigger criteria, retrieving associated video from a video repository based at least in part on the trigger criteria, wherein the retrieving of the associated video comprises retrieving the associated video based on metadata of the associated video, the metadata including a vehicle identifier, a camera identifier, a timestamp, a location, a heading, or any combination thereof.

18. A computer program product for telematics integration, the computer program product being embodied in a non-transitory computer readable storage medium and comprising computer instructions for:

receiving an event email notification from a telematics system, wherein the telematics system was provided an email address for the event email notification;

scraping, using a processor, the event email notification for event information, comprising:

parsing the event email notification for the event information, the event information including a) an associated location, an associated time stamp, or a combination thereof, and b) a vehicle identifier;

determining whether the event information passes a consistency check, comprising:

checking to see whether the event information is consistent with prior information regarding the same vehicle, the same customer, or both; and in response to a determination that the event information does not pass the consistency check, indicating that the event information does not pass the consistency check;

determining whether the event information satisfies criteria to generate trigger criteria for an event of interest, wherein the trigger criteria comprises a trigger location and a trigger time, a trigger area and trigger time, or a set of trigger times and a set of trigger locations, wherein the determining of whether the event information satisfies criteria to generate trigger criteria for an event of interest comprises:

performing three or more of the following:

A) determine whether the event is no longer of interest; and in response to a determination that the event is no longer of interest, determine that the event information does not satisfy criteria to generate trigger criteria for the event of interest;

B) determine whether the event is not of the right type; and in response to a determination that the event is not of the right type, determine that the event information does not satisfy criteria to generate trigger criteria for the event of interest;

C) determine whether the event is already sufficiently investigated; and in response to a determination that the event is already sufficiently investigated, determine that the event information does not satisfy criteria to generate trigger criteria for the event of interest;

D) determine whether the event is not in the trigger location or the set of trigger locations; and in response to a determination that the event is not in the trigger location or the set of trigger locations, determine that the event information does not satisfy criteria to generate trigger criteria for the event of interest; and/or E) determine whether the event is not at the trigger time; and in response to a determination that the event is not at the trigger correct time, determine that the event information does not satisfy criteria to generate trigger criteria for the event of interest; and in response to a determination that the event information satisfies the criteria to generate the trigger criteria, retrieving associated video from a video repository based at least in part on the trigger criteria, wherein the retrieving of the associated video comprises retrieving the associated video based on metadata of the associated video, the metadata including a vehicle identifier, a camera identifier, a timestamp, a location, a heading, or any combination thereof.

* * * * *